United States Patent [19]
Nelson

[11] 3,783,189
[45] Jan. 1, 1974

[54] TELEVISION SYSTEM FOR PRECISELY MEASURING DISTANCES

[75] Inventor: Christopher M. Nelson, Livermore, Calif.

[73] Assignee: The United States of America as represented by the United States Atomic Energy Commission, Washington, D.C.

[22] Filed: June 1, 1972

[21] Appl. No.: 258,643

[52] U.S. Cl. .......................... 178/6.8, 178/DIG. 36
[51] Int. Cl. .......................................... H04n 7/18
[58] Field of Search ................ 178/DIG. 1, DIG. 36, 178/DIG. 38; 356/153, 138, 142, 154, 241, 172; 33/263, 266, 286

[56] References Cited

UNITED STATES PATENTS

| | | | |
|---|---|---|---|
| 1,999,201 | 4/1935 | Nichols | 356/153 |
| 3,578,906 | 5/1971 | Holmstrom | 178/DIG. 36 |
| 3,530,235 | 5/1970 | Bolton | 178/DIG. 36 |

OTHER PUBLICATIONS

Bojman, Measurements With Closed Circuit Television, IBM, Tech. Disclosure Bulletin, Vol. 12, No. 1, June 1969, pp. 24, 25.

*Primary Examiner*—Robert L. Griffin
*Assistant Examiner*—Joseph A. Orsino, Jr.
*Attorney*—Roland A. Anderson

[57] ABSTRACT

An alignment detection system for the long pipe, including a television camera mounted at one end of the pipe for viewing pre-indexed light sources mounted inside and along the length of the pipe, a television display for viewing images of the light sources, a line generator for developing a plurality of $x$–$y$ traces on the television display, each $x$ and $y$ trace being movable to pass through a light-source image and thereby locate the image with respect to a reference point to indicate the amount of lateral pipe misalignment.

Microscopic lengths may also be measured with the system by magnifying the image of the length before viewing with the television camera and using only $y$ traces derived from a horizontal drive signal.

9 Claims, 7 Drawing Figures

PATENTED JAN 1 1974 3,783,189

TELEVISION SYSTEM FOR PRECISELY MEASURING DISTANCES

BACKGROUND OF THE INVENTION

The invention disclosed herein was made under, or in, the course of Contract No. W-7405-ENG-48 with the United States Atomic Energy Commission.

The invention relates to a television system for precisely measuring and monitoring distances, both microscopic and macroscopic, and in one particular use the invention relates to a television camera and display on which pre-indexed light sources are located along the length of a long structure and are viewed on the display to determine the amount of misalignment of the structure by the amount of deviation of the displayed light-source images from reference points on the display.

It is often desirable to precisely measure and monitor distances, both microscopic and macroscopic, and to do so remotely. For example, in conducting an underground nuclear test, the nuclear device is lowered down a borehole. Attached to the device and following it is a spacing cannister which is a long hollow structure, and following the spacing cannister and attached to it are diagnostic sections for obtaining various data during the explosion. In order for much of the data to be analyzed accurately, it is necessary that a clear view exist between the device and the diagnostic sections; and in practice, precise clear views are difficult to achieve for various reasons such as bends in the hole due to slight earth shifting or inaccuracies introduced during construction of the hole. Other misalignments between the device and diagnostic sections may be introduced during connection of the device to the spacing cannister, the connection of the sections of the spacing cannister and the connection of the diagnostic sections. However, a degree of lateral misalignment between the device and the diagnostic sections can be tolerated if the amount of misalignment is precisely known so that measurements taken by the diagnostic section can be corrected to take into account the any slight deviation from a clear straight-line view. Thus it is necessary that any measurements of lateral misalignment be made accurately and precisely; and moreover, because of the environment, the equipment for making the measurements should be rugged, reliable, simple and operable remotely over long distances.

SUMMARY OF THE INVENTION

The invention is a television system for precisely measuring the lateral distance of a point of interest on an object with respect to a reference point and includes a television camera for viewing the object, a television display coupled to the camera for displaying images of the point of interest and the reference point, means for generating a trace on the television display, means for moving the trace to pass through the object point image, and means for indicating the lateral distance of the trace from the reference point.

It is an object of the invention to measure and/or monitor both microscopic and macroscopic distances by means of a television system.

Another object is to simply, reliably, accurately and remotely monitor the alignment of a long structure.

Another object is to monitor the alignment of a spacing cannister used in connection with an underground nuclear explosion.

Another object is to generate lines on a television display that extend the full width or length of the display and are movable over the entire face of the display.

Other objects and advantageous features of the invention will be apparent in a description of a specific embodiment thereof, given by way of example only, to enable one skilled in the art to readily practice the invention which is described hereinafter with reference to the accompanying drawing.

DESCRIPTION OF AN EMBODIMENT

Figure 1:
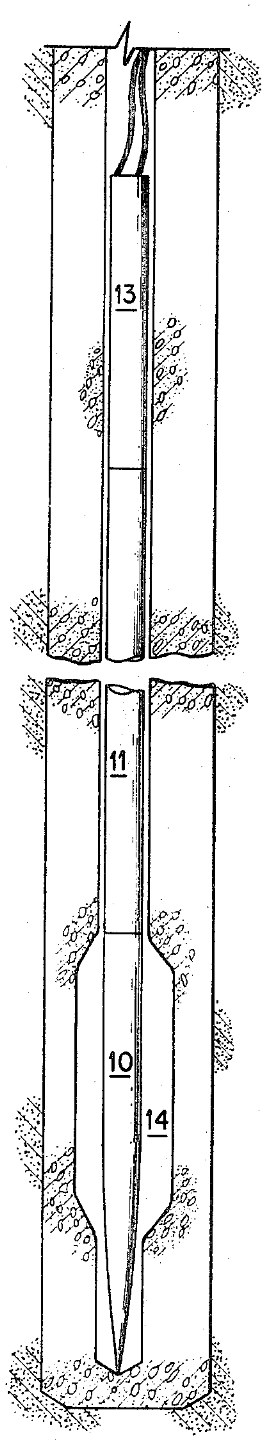
FIG. 1 is a side view of an encased nuclear device attached to its spacing cannister and diagnostic section, all emplaced in a grouted borehole shown in cross section.

Referring to the drawing there is shown in FIG. 1 an encased nuclear device 10 attached to a spacing cannister 11 and diagnostic section 13, all emplaced at the bottom of a grouted borehole 14. The diagnostic section 13 includes radiation detection devices for determining the nature of the nuclear explosion upon detonation of the device 10. Because of the extent of such an explosion, the diagnostic section must be spaced a considerable distance from the device 10 in order that there be a sufficient amount of time prior to destruction of the section 13 to obtain a significant amount of data. It therefore may be necessary for the spacing cannister 11 to be very long, on the order of several hundred feet.

Figures 2, 3, 7:
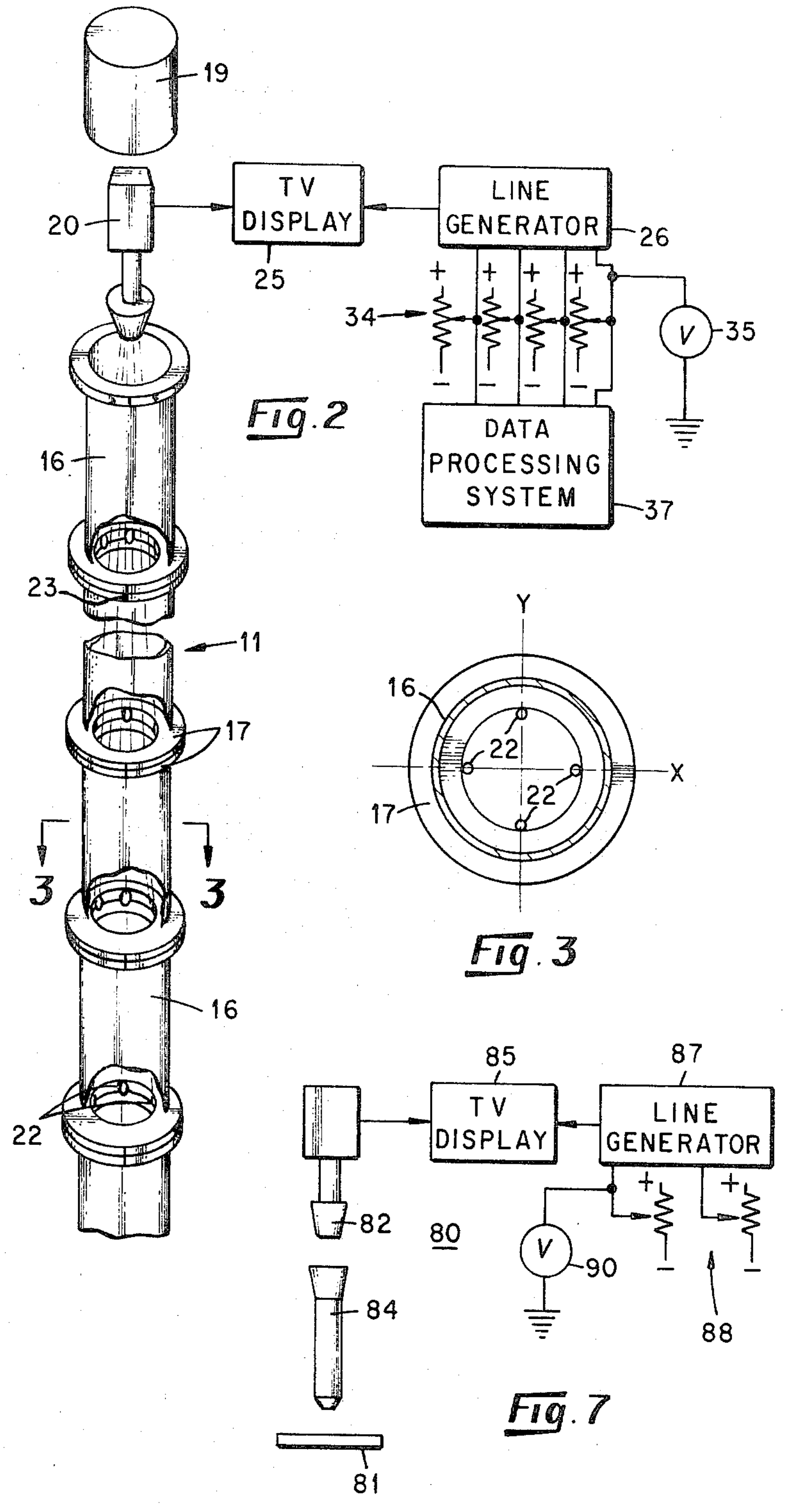
FIG. 2 is a perspective view with portions broken away of the spacing cannister of FIG. 1 equipped with pre-indexed light sources whose positions are monitored with a television system including a camera downhole in the diagnostic section and a display and controls above ground.
FIG. 3 is a cross-sectional view of the cannister of FIG. 2 taken along lines 3—3.
FIG. 7 is a block diagram of a television system for measuring and/or monitoring microscopic distances.
Figure 4:
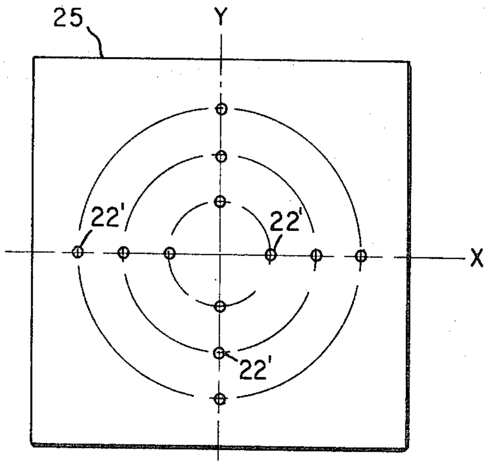
FIG. 4 is a view of the television display of FIG. 2 on which images of the light sources are shown in positions which indicate that all sections of the cannister are aligned so that their central axes are coaxial.

In FIG. 2, the spacing cannister 11 is shown in more detail as being comprised of a plurality of sections 16 interconnected during emplacement of the device by means of flanges 17. At the upper end of the section 11, and mounted in the section 13, is radiation detection equipment 19 for obtaining data about the nuclear explosion. In order for the data to be analyzed accurately, it is necessary to know the amount of any deviation from a clear view between the equipment 19 and the device 10. This may be accomplished by mounting a television camera 20 in the lower end of the section 13, facing the device 10. Light sources 22 are mounted along the length of the cannister 11 on the inside wall in groups of four at periodic intervals and in pre-indexed aligned positions for viewing by the camera 20. In FIG. 3, a cross-sectional view of the cannister 11, taken along lines 3—3 of FIG. 2, is shown in which four light sources 22 of a single group are shown. The four light sources of each group lie in a common plane that is perpendicular to the axis of the spacing cannister 11 and are equally spaced around the inner perimeter of the associated section 16 or flange 17 so that one light source of each group coincides with each arm of an $x$ $-y$ coordinate system. As the sections 16 are connected during emplacement of the device, the sections are aligned, such as by index marks 23 on the flanges 17 so that each group of light sources directly overlies the following group. Thus, in the absence of any deflecting forces, all of the light sources are aligned. The position of the light sources may be viewed on a television display 25 to which the camera 20 is coupled, camera 20 also being pre-indexed. In the absence of deflecting forces and with all light sources aligned, the display 25 displays images 22' (FIG. 4) of the light sources as lying along a set of $x$ $-y$ axes so that each successive group of light-source images toward the origin of the $x$ $-y$ axes represent the next successive group of light sources away from the camera 20.

Figure 5:
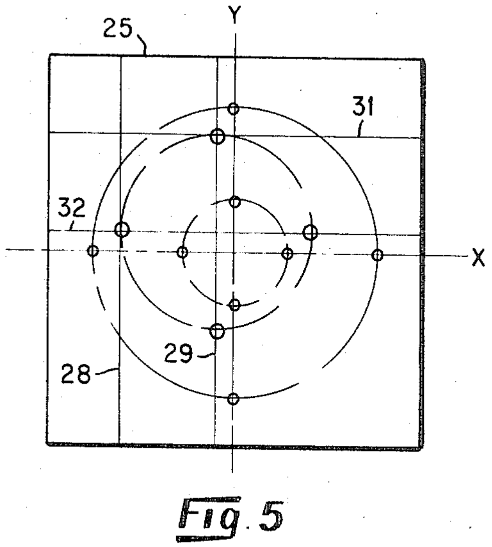
FIG. 5 is a view of the television display of FIG. 2 on which the light source images are shown in positions which indicate that a central section of the cannister is displaced from an aligned position with the other sections, and on which $x$ and $y$ traces are shown passing through three of the images that are displaced from their aligned positions.

When a deflecting force, such as due to a bend in the borehole 14, acts on the spacing cannister 11, the cannister section affected moves and carries the associated light sources out of alignment with the other sources. This causes the corresponding images 22' on the display 25 to move out of alignment with the $x$ $-y$ axes and other images. A representative display of images of the group of light sources on the second cannister section away from the camera are shown in FIG. 5 when these sources are moved out of alignment with the adjacent cannister sections.

The distances that the light-source images move away from respective axes on the display 25 is a measure of the lateral misalignment of the cannister section that carries the light sources. These distances are measured by means of a line generator 26 (FIG. 1) which generates lines 28 and 29 (FIG. 5) for measuring distances in the $x$ direction and lines 31 and 32 for measuring distances in the $y$ direction. An adjustable potentiometer 34 (FIG. 2) is provided for each of the lines for controlling the line generator 26 for adjustment of each of the lines to move across the face of the display parallel to the respective $x$ and $y$ axes. The potentiometers 34 may be calibrated, prior to emplacement of the cannister 11 in the borehole, so that the distance moved by a light source can be directly read from the potentiometer setting when the corresponding line is centered on the image. Alternatively, the voltage across each potentiometer may be read by means of a digital voltmeter 35 to indicate the distance a light source moves; or the potentiometers may be connected to a data processing system 37 for directly indicating and recording the lateral position of each light source.

Figure 6:
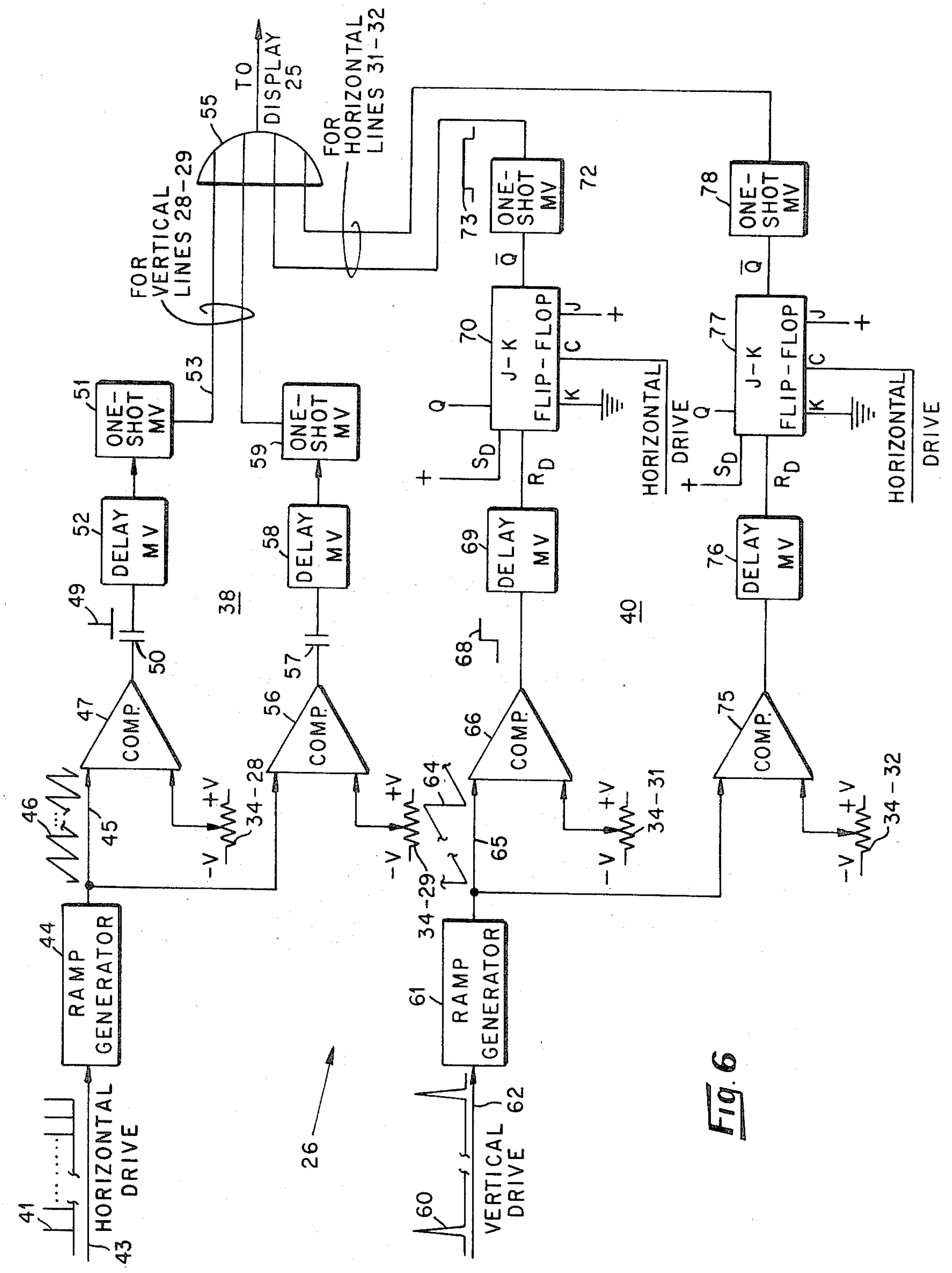
FIG. 6 is a block diagram of a line generator used for developing the $x$ and $y$ line signals of FIG. 5.

The generation of the lines 28, 29, 31 and 32, and their control by means of the potentiometers 34 may be more fully understood by reference to FIG. 6 in which the line generator 26 is shown in more detail and in which the potentiometers bear numerical designations corresponding to the line which is controlled thereby. The generator 26 includes a section 38 for generating vertical line pulses and a section 40 for generating horizontal line pulses. The section 38 is triggered by horizontal drive pulses 41 which are available from the conventional television display 25 and applied over a connection 43 to a conventional linear ramp generator 44. In response to each pulse 41, a very linear ramp signal 46 is generated and applied over a connection 45 to a comparator 47 which may conveniently be a conventional Schmitt trigger circuit. The rise of each signal 46 is compared to a DC bias voltage from the potentiometer 34–28. When the voltages become equal, the voltage at the output of the comparator 47 rises rapidly, and is applied to a capacitor 50 for developing a spike signal 49. The spike is applied to a delay multivibrator 52; and a one-shot multivibrator 51 connected to the output of multivibrator 52 reproduces the spike at its output. The multivibrator 52 is adjustable to delay the occurrence of the spike at the output of the multivibrator 51 for purposes of calibration of the line generator. The output from the multivibrator 51 is applied over a connection 53 to an OR gate 55 for transmission to the display 25 for controlling the electron beam of the display to be ON for an instant during the sweep that is initiated by the corresponding horizontal drive pulse 41. That instant corresponds to the time that the ramp pulse 46 equals the DC bias voltage from potentiometer 34–28. Since a spike 49 is generated during each horizontal sweep, the resulting series of spikes on connection 53 may be used to control the display 25 to exhibit the vertical line 28. By adjustment of the potentiometer 34–28, the DC bias voltage may be varied so that the coincidence of equal voltages at the input of comparator 47 is varied over the horizontal sweep period, which period is also the pulse repetition rate of the pulses 41 and 46. The line 28 thus may be moved over the entire face of the display 25. The multivibrator 52 permits a fine adjustment of the line 28 so that it coincides with the $y$ axis when the potentiometer 34–28 is set at a centered indexed position.

The vertical line 29 is generated in a manner identical to that for line 28 by circuitry including a comparator 56, a capacitor 57, a delay multivibrator 58, and a one-shot multivibrator 59. This circuitry generates spikes under control of the potentiometer 34–29 that are applied through the gate 55 to the display 25 to control the exhibit of the line 29.

The generation of the horizontal lines 31 and 32 occurs in the section 40 (FIG. 6) of the line generator 26. Vertical drive pulses 60 are available from the conventional television display 25 and are applied to a conventional linear ramp generator 61 over a connection 62. In response to each pulse 60, a very linear ramp signal 64 is generated and applied over a connection 65 to a comparator 66 which, as with the comparator 47 and 56, may conveniently be a conventional Schmitt trigger circuit. The rise of each signal 64 is compared to a DC bias voltage from the potentiometer 34–31. When the voltages become equal, the output of the comparator 66 rises reqidly, producing a signal 68 which is applied to the reset drive input $R_D$ of a J-K flip-flop 70 through a delay multivibrator 69. The signal 68 "enables" the flip-flop 70 to go through one cycle of operation to produce an output signal at a $\overline{Q}$ terminal in response to the next horizontal drive pulse 41 applied to a clock terminal C. Thus, at the beginning of the next full horizontal sweep after the voltages at the input of the comparator 66 become equal, an output signal is produced at the $\overline{Q}$ terminal. A one-shot multivibrator 72 is connected to the $\overline{Q}$ terminal and is triggered by each output signal therefrom to generate a signal 73 having a period equal to the horizontal sweep period of the television display 25. The signal 73 is applied through the gate 55 to the display 25 for controlling the electron beam of the display to be ON for the entire period of the horizontal sweep initiated by the pulse 41 that triggered the output signal at $\overline{Q}$. Even though successive horizontal drive pulses 41 are applied to the terminal C, the flip-flop 70 will not cycle until the next pulse 68 is developed during the period of the next ramp signal 64. The pulse repetition rate of the signals 60 and 64 are equal to the period required for a full vertical sweep of the television display 25. Thus, one horizontal line, such as line 31, is generated by the comparator 66 during each vertical sweep period. By adjustment of the potentiometer 34–31, the DC bias voltage applied to the comparator 66 may be varied so that the coincidence of equal voltages at the input of the comparator 66 is varied over the vertical sweep period. The horizontal line 31, thus, may be moved over the entire face of the display 25, occupying successive horizontal sweep positions. The delay multivibrator 69 permits a fine adjustment of the line 31 so that it coincides with the $x$ axis when the potentiometer 34–31 is set at a centered indexed position.

The horizontal line 32 is generated in a manner that is identical to that for line 31 by circuitry including a comparator 75, a delay multivibrator 76, a J–K flip-flop 77, and a one-shot multivibrator 78. This circuitry generates signals under control of the potentiometer 34–32 that are applied to the display 25 through the gate 55 to control the exhibit of the line 32.

Additional vertical or horizontal lines may be generated by adding additional comparators and associated circuitry to sections 38 and 40 in parallel with the comparators 47, 56 and 66, 75, respectively.

In operation, the groups of lights 22 (FIG. 2) are turned on successively and any deviation from aligned positions on the $x$ –$y$ axes is measured with the lines 28, 29 and 31, 32. Since the distance from the camera 20 to each group of lights is known, the voltage readings or settings of the potentiometers 34 may be correlated with the distance to give the amount of misalignment of any cannister section. Such correlation conveniently may be accomplished above-ground prior to emplacement of the cannister.

Another use of the invention is the measurement of microscopic distances such as the creep of cracks in stressed or vibrating metal specimens, or the length of microscopic biological specimens such as protozoa. In such a use of the invention, a system 80 (FIG. 7) could be used in which a microscopic specimen 81 is viewed with a television camera 82 through magnifying means such as a lens or a microscope 84. The specimen is viewed on a television display 85. A pair of vertical lines are generated by means of a line generator 87 under control of potentiometers 88. A voltmeter 90 may be connected to the potentiometer 88 for reading the voltages when the vertical lines encompass the length to be measured. The voltages may be correlated with lateral distances such as by including a graduated scale in the plane of the specimen in view of the camera 82.

Tests of embodiments of the invention have shown that for distances up to 800 feet, readings are accurate to within one-half inch. One embodiment of the invention was used with the equipment for the U. S. Atomic Energy Commission's CANNIKIN nuclear event on Nov. 6, 1971, at Amchitka Island, Alaska, which was a proof test of the warhead for the SPARTAN missile of the SAFEGUARD ballistic missile defense program. In that event, the nuclear device was emplaced downhole 5,875 feet below the surface of the earth. The spacing cannister was 800 feet long and has an interior diameter viewed by the television camera ranging from 8 inches at the device end to 5 feet at the end connected to the diagnostic section. The light sources were arranged in groups of four and were spaced approximately 100 feet apart. The light sources were incandescent and had a candlepower of 3.5 candles. In another use of the invention, the development of a microscopic crack in a metal specimen being vibrated was monitored. The accuracy of the readings were found to be correct to three figures.

While an embodiment of the invention has been shown and described, further embodiments or combinations of the invention described herein will be apparent to those skilled in the art without departing from the spirit of the invention.

What I claimed is:

1. A television system for precisely measuring lateral distances with respect to a reference point, including:
   - an object having a point to be measured with respect to said reference point;
   - a television camera for viewing said object;
   - a television display showing said reference point and coupled to said camera for displaying an image of said object point with respect to said reference point; and
   - means for generating a line on said television display including adjustable means for moving said line on said display to pass through said object point, said generating means further including means for indicating the distance of said line from said reference point to thereby indicate the lateral distance of said object point from said reference point, said generating means further including
   - a source of vertical drive pulses for controlling the vertical deflection of an electron beam across the face of said television display;
   - a voltage comparator;
   - a ramp generator responsive to each of said vertical drive pulses for generating a linear ramp signal having the same pluse repetition rate as said vertical drive pulses for application to said voltage comparator;
   - a source of DC bias voltage applied to said comparator, said comparator generating an output pulse upon said ramp signal rising to the level of said DC bias voltage;
   - a source of horizontal drive pulses for controlling the horizontal deflection of an electron beam across the face of said television display;
   - a J–K flip-flop responsive to each of said comparator output signals to enable the flip-flop for a cycle of operation;
   - means for applying said horizontal drive pulses to said flip-flop to trigger said flip-flop to go through a cycle of operation and produce an output pulse upon the occurrence of the next horizontal drive pulse after said flip-flop is enabled by said comparator signal; and
   - a one-shot multivibrator responsive to each of said flip-flop output pulses to produce an output pulse having a period equal to the pulse repetition rate of said horizontal drive pulses, said multivibrator output pulse being applied to said television display for generating a horizontal line for exhibition on said display.

2. The system of claim 1, wherein said object is an enlongated structure and said television camera is located at one end of said structure, further including:

a plurality of light sources attached to said structure for movement therewith, said sources being located along the length of said structure in pre-indexed positions, images of said souces being viewable on said display, and wherein said generating means further includes means for generating a plurality of lines viewable on said display, including a first line parallel to an x-axis reference and a second line parallel to a y-axis reference, said adjustable means being operable to move said first and second lines across said display to a position in which the lines pass through a light-source image to indicate the distance of said lines from the x-axis and y-axis references, respectively, thereby indicating the amount of lateral misalignment of said structure.

3. The system of claim 2, wherein said elongated structure is a pipe and said light sources are mounted on the internal wall of the pipe, along the length of the pipe.

4. The system of claim 3, wherein said plurality of light sources are arranged in a plurality of groups, each group being comprised of four light sources spaced apart 90° around the axis of the pipe, the light sources of each group lying in a plane transverse to the axis of the pipe, the groups of light sources being indexed for alignment with one another so that overlying aligned sources lie in straight lines that are parallel to the pipe axis.

5. The system of claim 2, further including:

a nuclear device for emplacement in a borehole;

radiation detection means; and wherein said elongated structure is a spacing cannister for spacing said radiation detection means from said nuclear device.

6. The system of claim 1, wherein said line generating means includes means for generating a line for display in a direction that is perpendicular to said horizontal deflection of said electron beam.

7. The system of claim 1, wherein said object is microscopic, and further including magnifying means for transmitting an image of said object to said television camera.

8. The system of claim 1, wherein said line generating means includes:

a second voltage comparator;

a second ramp generator responsive to each of said horizontal drive pulses for generating a linear ramp signal having the same pulse repetition rate as said horizontal drive pulses for application to said second voltage comparator; and a second source of DC bias voltage applied to said second comparator, said second comparator generating an output pulse upon said ramp signal from said second generator rising to the level of second DC bias voltage, each of said second comparator output pulses being applied to said television display for generating a vertical line for exhibition in a direction that is perpendicular to the horizontal deflection of the electron beam.

9. The system of claim 1, wherein said line generating means includes means for delaying the occurrence of said line with respect to a reference point to enable said adjustable means to be set to an index point prior to movement of said line to pass through said object point.

* * * * *